United States Patent
Brown et al.

(10) Patent No.: US 12,367,520 B2
(45) Date of Patent: Jul. 22, 2025

(54) VEHICLE SALE SYSTEMS AND METHODS FOR OFFERING DEALER SERVICES TO VEHICLE SELLER AND VEHICLE BUYER

(71) Applicant: Toyota Motor North America, Inc., Plano, TX (US)

(72) Inventors: Tyler J. Brown, Dallas, TX (US); Michael Dorazio, Santa Monica, CA (US); Imad Zahid, Carrollton, TX (US); Gunnar R. Heinisch, McKinney, TX (US)

(73) Assignee: Toyota Motor North America, Inc., Plano, TX (US)

( * ) Notice: Subject to any disclaimer, the term of this patent is extended or adjusted under 35 U.S.C. 154(b) by 206 days.

(21) Appl. No.: 17/713,774

(22) Filed: Apr. 5, 2022

(65) Prior Publication Data
US 2023/0316376 A1    Oct. 5, 2023

(51) Int. Cl.
*G06Q 30/0601* (2023.01)
*G06Q 30/0202* (2023.01)

(52) U.S. Cl.
CPC ..... *G06Q 30/0631* (2013.01); *G06Q 30/0202* (2013.01)

(58) Field of Classification Search
CPC .................................................. G06Q 30/0631
See application file for complete search history.

(56) References Cited

U.S. PATENT DOCUMENTS

| | | | |
|---|---|---|---|
| 6,895,388 B1 * | 5/2005 | Smith | G06Q 30/0641 |
| | | | 705/26.62 |
| 7,028,002 B2 | 4/2006 | Wakabayashi et al. | |
| 7,603,293 B2 | 10/2009 | Chenn | |
| 7,921,052 B2 * | 4/2011 | Dabney | G06Q 40/04 |
| | | | 705/37 |
| 8,005,731 B1 * | 8/2011 | Wolfe | G06Q 30/0635 |
| | | | 705/35 |
| 8,032,419 B2 | 10/2011 | Chenn | |
| 8,442,884 B2 | 5/2013 | Haberstroh | |

(Continued)

FOREIGN PATENT DOCUMENTS

| | | | |
|---|---|---|---|
| JP | 2003067592 A | 3/2003 | |
| JP | 2021068334 A | 4/2021 | |

(Continued)

OTHER PUBLICATIONS

Huang, Guofang, Hong Luo, and Jing Xia. "Invest in information or wing it? A model of dynamic pricing with seller learning." A Model of Dynamic Pricing with Seller Learning (Sep. 2, 2015). (Year: 2015).*

(Continued)

*Primary Examiner* — Andre D Boyce
(74) *Attorney, Agent, or Firm* — Dinsmore & Shohl LLP (57) ABSTRACT

A method and system for facilitating a vehicle transaction are provided. The method includes receiving a vehicle listing from a seller device identifying a seller vehicle to be sold, identifying market trends based on previous vehicle transactions related to the seller vehicle, and causing one or more seller suggestions to be displayed on the seller device identifying one or more modifications to the seller vehicle which, if satisfied, would increase a probability that the seller vehicle will be matched to a buyer request received from a buyer device.

17 Claims, 7 Drawing Sheets

(56) References Cited

U.S. PATENT DOCUMENTS

| | | | |
|---|---|---|---|
| 8,527,357 B1* | 9/2013 | Ganesan | G06Q 30/06 |
| | | | 705/26.1 |
| 9,691,095 B2 | 6/2017 | McCluskey | |
| 10,600,103 B2 | 3/2020 | McCluskey | |
| 2002/0169640 A1 | 11/2002 | Freeland | |
| 2005/0010503 A1 | 1/2005 | Ratnayake | |
| 2008/0103943 A1 | 5/2008 | Williams et al. | |
| 2009/0271296 A1 | 10/2009 | Romero | |
| 2010/0042508 A1 | 2/2010 | Bundy et al. | |
| 2010/0257104 A1* | 10/2010 | Bundy | G06Q 50/188 |
| | | | 705/305 |
| 2012/0036033 A1* | 2/2012 | Seergy | G06F 3/167 |
| | | | 705/26.3 |
| 2012/0197699 A1* | 8/2012 | Snell | G06Q 30/08 |
| | | | 705/26.3 |
| 2012/0265634 A1 | 10/2012 | Kinney | |
| 2012/0303474 A1* | 11/2012 | Sanel | G06Q 30/08 |
| | | | 705/26.4 |
| 2012/0316997 A1* | 12/2012 | Herbert | G06Q 30/06 |
| | | | 705/27.1 |
| 2013/0197971 A1* | 8/2013 | Wilke | G06Q 30/0269 |
| | | | 705/7.31 |
| 2014/0289078 A1* | 9/2014 | Paul | G06Q 30/0623 |
| | | | 705/26.61 |
| 2015/0058151 A1* | 2/2015 | Sims | G06Q 30/08 |
| | | | 705/26.3 |
| 2016/0189260 A1* | 6/2016 | Nagla | G06Q 30/0611 |
| | | | 705/26.4 |
| 2017/0270580 A1* | 9/2017 | Esposito | G06Q 30/0613 |
| 2017/0300991 A1* | 10/2017 | Aggarwal | G06Q 30/0283 |
| 2017/0337573 A1* | 11/2017 | Toprak | G06Q 10/20 |
| 2018/0018723 A1* | 1/2018 | Nagla | H04L 63/08 |
| 2018/0096398 A1 | 4/2018 | Wickett | |
| 2019/0073703 A1 | 3/2019 | Aggarwal | |
| 2020/0027141 A1* | 1/2020 | Tompkins | G06Q 30/0205 |
| 2020/0167811 A1* | 5/2020 | Aggarwal | G06Q 30/0202 |
| 2020/0349595 A1* | 11/2020 | Anderson | G06F 30/20 |
| 2020/0380589 A1 | 12/2020 | Clark et al. | |
| 2021/0049686 A1* | 2/2021 | Frazer | G06Q 20/127 |
| 2021/0110466 A1* | 4/2021 | Zhukov | G06Q 30/08 |
| 2021/0312406 A1* | 10/2021 | Dedes | G07C 5/008 |
| 2021/0390570 A1* | 12/2021 | Rabenold | G06Q 30/0278 |
| 2022/0198556 A1* | 6/2022 | Baghestani | G06Q 30/0625 |

FOREIGN PATENT DOCUMENTS

| | | |
|---|---|---|
| KR | 20010000631 A | 1/2001 |
| KR | 101185968 B1 | 9/2012 |
| KR | 20170055332 A | 5/2017 |
| WO | 0215129 A2 | 2/2002 |
| WO | 2010134534 A1 | 11/2010 |
| WO | 2019227449 A1 | 12/2019 |
| WO | 2021157754 A1 | 8/2021 |

OTHER PUBLICATIONS

Lacetera, Nicola, Devin G. Pope, and Justin R. Sydnor. "Heuristic thinking and limited attention in the car market." American Economic Review 102.5 (2012): 2206-2236. (Year: 2012).*

Carro (https://carro.sg/used-car-loan), 3 pgs, accessed on Dec. 6, 2021.

Tred (https://www.tred.com/), 6 pgs, accessed on Dec. 6, 2021.

Truebil (https://www.truebil.com/), 3 pgs, accessed on Dec. 6, 2021.

* cited by examiner

VEHICLE SALE SYSTEMS AND METHODS FOR OFFERING DEALER SERVICES TO VEHICLE SELLER AND VEHICLE BUYER

TECHNICAL FIELD

The present specification generally relates to systems and methods for facilitating a vehicle sale and, more specifically, systems and methods for providing an opportunity for a dealer to offer one or more services to a vehicle seller and vehicle buyer to facilitate the vehicle sale.

BACKGROUND

As background, used car sales between individual sellers and buyers typically occur without any dealer involvement. This results in lost opportunities for dealers to interact with used car sellers and buyers and offer various benefits such as, for example, vehicle inspections, certifications, and financing options to the buyer. Additionally, current services facilitating vehicle sales between a seller and a buyer do not offer recommendations for vehicle modifications, such as upgrades and downgrades, to improve the likelihood that a vehicle will be purchased. By providing recommendations of such modifications, there is a greater likelihood that a purchase request from a potential buyer may be satisfied. This also allows the dealer to assist the seller by performing the various vehicle upgrades/downgrades.

Accordingly, a need exists for improved vehicle sale systems and methods that permit a dealer to offer services that would otherwise be overlooked during vehicle sales transactions.

SUMMARY

In one embodiment, a method includes: receiving a vehicle listing from a seller device identifying a seller vehicle to be sold; identifying market trends based on previous vehicle transactions related to the seller vehicle; and causing one or more seller suggestions to be displayed on the seller device identifying one or more modifications to the seller vehicle which, if satisfied, would increase a probability that the seller vehicle will be matched to a buyer request received from a buyer device.

In another embodiment, a vehicle system includes: a server configured to: receive a vehicle listing from a seller device identifying a seller vehicle to be sold; identify market trends based on previous vehicle transactions related to the seller vehicle; and causing one or more seller suggestions to be displayed on the seller device identifying one or more modifications to the seller vehicle which, if satisfied, would increase a probability that the seller vehicle will be matched to a buyer request received from a buyer device.

In yet another embodiment, A vehicle system includes: a server configured to: receive a vehicle listing from a seller device identifying a seller vehicle to be sold; identify market trends based on previous vehicle transactions related to the seller vehicle; send one or more seller suggestions to the seller device identifying one or more modifications to the seller vehicle which, if satisfied, would increase a probability that the seller vehicle will be matched to a buyer request received from a buyer device; and in response to the one or more seller suggestions being accepted by the seller device, send a signal to a dealer device to perform one or more dealer services, the one or more dealer services selected from the group consisting of inspection of the seller vehicle, reconditioning of the seller vehicle, and certification of the seller vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to systems and methods for providing an opportunity for a dealer to offer one or more dealer services to a vehicle seller and/or a vehicle buyer to facilitate the vehicle sale.

The systems and methods for facilitating a vehicle transaction generally include receiving a vehicle listing from a seller device identifying a seller vehicle to be sold, identifying market trends based on previous vehicle transactions related to the seller vehicle, and sending one or more seller suggestions to the seller device identifying one or more modifications to the seller vehicle which, if satisfied, would increase a probability that the seller vehicle will be matched to a buyer request received from a buyer device. Various embodiments of the systems and methods, and the operation of the systems are described in more detail herein. Whenever possible, the same reference numerals will be used throughout the drawings to refer to the same or like parts.

Figure 1:
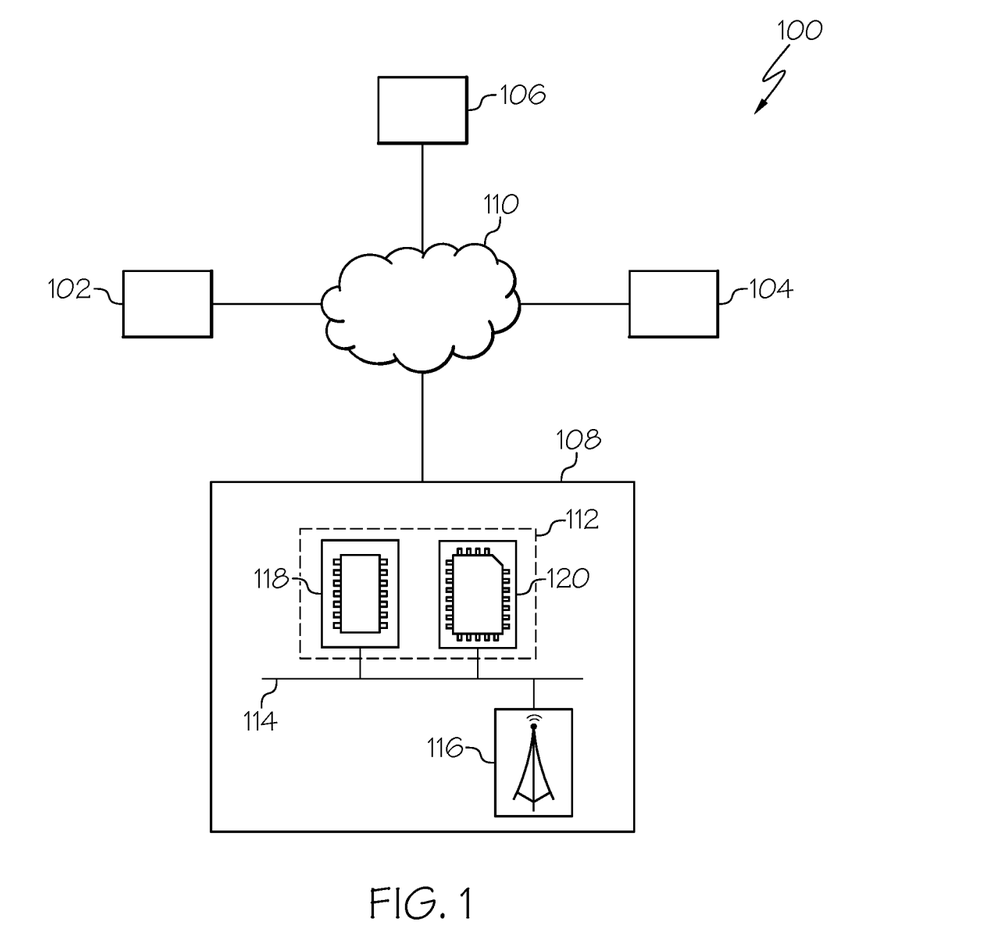
FIG. 1 schematically depicts a diagram of a vehicle sale system, according to one or more embodiments shown and described herein.

Referring now to FIG. 1, a vehicle sale system 100 is illustrated according to one or more embodiments described herein. The vehicle sale system 100 may generally include a seller device 102, a buyer device 104, a dealer device 106, and a server 108. It should be appreciated that although only a single seller device 102, buyer device 104, and dealer device 106 is illustrated, the vehicle sale system 100 may include any number of seller devices 102, buyer devices 104, and dealer devices 106. In addition, although the operation of the server 108 is described in detail herein communicating with each of the seller device 102, the buyer device 104, and the dealer device via a network 110, it should be appreciated that the dealer device 106 may be configured to perform all of the functions of the server 108 and communicate directly between the seller device 102 and the buyer device 104 without requiring the server 108 to relay information therebetween.

Moreover, it should be appreciated that the vehicle sale system 100 may include a plurality of servers 108 such that each server 108 is assigned to a particular or predetermined geographic region and communicates with those seller devices 102, buyer devices 104, and dealer devices 106 in the particular geographic region. In embodiments, the particular server 108 only communicates with those seller devices 102, buyer devices 104, and dealer devices 106 in the particular geographic region and may communicate with a global server to transmit data between individual servers 108.

It should be appreciated that by assigning a server 108 to a particular geographic region, the required time and processing power required to analyze data received from the seller devices 102, buyer devices 104, and dealer devices 106 in the particular geographic region is less than that required by processing additional information outside of the geographic region that may be unnecessary for the particular server 108. Additionally, by allocating a server 108 to each geographic region and distributing the workload among the plurality of servers 108, the latency of data transmitted to each server 108 is reduced.

In general, the seller device 102 is configured to allow a user, i.e., a seller, to create a vehicle listing identifying a vehicle to be sold. The seller device 102 may be any suitable device such as, for example, a mobile computing device, configured to receive user input to create the vehicle listing. The vehicle listing may include any relevant information such as, for example, the make and model of the vehicle, the list price, and the previous work performed on the vehicle including upgrades and/or downgrades to vehicle components, replacement of vehicle components, and maintenance. In embodiments, the seller device 102 sends the vehicle listing to the server 108 where the vehicle listing is posted within a software application, such as a cloud-based application, and viewable by other users, such as those operating the buyer device 104 and the dealer device 106.

Similarly, the buyer device 104 is operated by a user, i.e., a buyer, to create a profile and submit one or more buyer requests that identify a vehicle or criteria for a vehicle to be purchased. The criteria may include similar criteria to that listed in a vehicle listing such as, for example, the make and model of the vehicle, a price range, and the like. In embodiments, the buyer requests are created at the buyer device 104 and sent to the server 108. In embodiments, the buyer requests may be viewed within the software application by other sellers, buyers, and/or dealers. As with the seller device 102, the buyer device 104 may be any suitable device such as, for example, a mobile computing device, configured to receive user input to create the buyer requests.

In embodiments, the dealer device 106 is configured to permit a user, i.e., a dealer, to offer services to one or both of the user of the seller device 102 and the user of the buyer device 104. The services offered by the dealer may be provided either prior to matching a vehicle listing with a buyer request or after matching a vehicle listing to a buyer request. Such services to be offered by the dealer may include, but are not limited to, inspection of the vehicle to be sold, reconditioning of the vehicle, certification of the vehicle, scheduling a test drive of the vehicle, preparation of a purchase agreement, preparation of registration and title transfer documents, delivery of the vehicle, new vehicle incentives to the seller, and trial membership for connected services to the buyer. In addition, as discussed in more detail herein, the dealer may assist in facilitating various upgrades and downgrades to the vehicle as determined by the server 108 when matching a buyer request to a vehicle listing. Alternative, in some embodiments, upgrades and downgrades may be determined by the dealer device 106 itself, which may then be accepted by the seller device 102 and/or buyer device 104. Suggestions to make these upgrades and/or downgrades to the vehicle may be determined by the server 108 based on market trends of previous vehicle sales. More particularly, as discussed in more detail herein, the server 108 may analyze market trends of previous vehicle sales for vehicles similar or related to the vehicle in the particular vehicle listing and send suggestions to the seller device 102 to make specific vehicle upgrades and/or downgrades to increase the likelihood or probability that the vehicle listing will be matched to a buyer request.

Referring still to FIG. 1, a schematic diagram of the vehicle sale system 100 is depicted illustrating individual hardware components of the server 108. As noted above, it should be appreciated that any number of seller devices 102, buyer devices 104, and dealer devices 106 may be provided and include the same structure and components. Similarly, it should be appreciated that any number of servers 108 may be provided and include the same structure and components. As such, only the structure and components of the server 108 are discussed in detail herein.

In embodiments, the server 108 includes a controller 112, a communication path 114, and network interface hardware 116. The communication path 114 is formed from any medium that is capable of transmitting a signal such as, for example, conductive wires, conductive traces, optical waveguides, or the like. Moreover, the communication path 114 may be formed from a combination of mediums capable of transmitting signals. In one embodiment, the communication path 114 includes a combination of conductive traces, conductive wires, connectors, and buses that cooperate to permit the transmission of electrical data signals to components such as processors, memories, sensors, input devices, output devices, and communication devices. Accordingly, the communication path 114 may include a bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 114 communicatively couples the various components of the server 108. As used herein, the term "communicatively coupled" means that coupled components are capable of exchanging data signals with one another such as, for example, electrical signals via conductive medium, electromagnetic signals via air, optical signals via optical waveguides, and the like.

As noted above, the server 108 includes the controller 112 including one or more processors 118 and one or more memory modules 120. Each of the one or more processors 118 may be any device capable of executing machine readable instructions. Accordingly, each of the one or more processors 118 may be an integrated circuit, a microchip, a computer, or any other computing device. The one or more processors 118 are communicatively coupled to the other components of the server 108 by the communication path 114. Accordingly, the communication path 114 may communicatively couple any number of processors with one another, and allow the modules coupled to the communication path 114 to operate in a distributed computing environment. Specifically, each of the modules may operate as a node that may send and/or receive data.

Each of the one or more memory modules 120 of the server 108 is coupled to the communication path 114 and communicatively coupled to the one or more processors 118. The one or more memory modules 120 may include RAM, ROM, flash memories, hard drives, or any device capable of storing machine readable instructions such that the machine readable instructions may be accessed and executed by the one or more processors 118. The machine readable instructions may include logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 120. In some embodiments, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. As noted above and discussed in more detail herein, in embodiments, the one or more memory modules 120 may include machine learning capabilities configured to analyze market trends of previous vehicle sales and transactions executed within the vehicle sale system 100. This analysis of market trends may be utilized to identify potential upgrades and downgrades to the vehicle of the vehicle listing that may be performed by the buyer, or in some embodiments, by the dealer, to improve the probability of matching the vehicle with a particular buyer request.

As noted above, the server 108 includes the network interface hardware 116 for communicatively coupling the server 108 with the seller device 102, the buyer device 104, and the dealer device 106 via a network 110. The network interface hardware 116 is coupled to the communication path 114 such that the communication path 114 communicatively couples the network interface hardware 116 to other modules of the server 108. The network interface hardware 116 may be any device capable of transmitting and/or receiving data via a wireless network. Accordingly, the network interface hardware 116 may include a communication transceiver for sending and/or receiving data according to any wireless communication standard. For example, the network interface hardware 116 may include a chipset (e.g., antenna, processors, machine readable instructions, etc.) to communicate over wireless computer networks such as, for example, wireless fidelity (Wi-Fi), WiMax, Bluetooth®, IrDA, Wireless USB, Z-Wave, ZigBee, or the like. In some embodiments, the network interface hardware 116 includes a Bluetooth® transceiver that enables the server 108 to exchange information with a mobile device such as, for example, a smartphone, via Bluetooth® communication.

The network 110 may include one or more computer networks (e.g., a personal area network, a local area network, or a wide area network), cellular networks, satellite networks and/or a global positioning system and combinations thereof. Accordingly, the server 108 can be communicatively coupled to the network 110 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

As discussed above, although not shown, the seller device 102, the buyer device 104, and the dealer device 106 include network interface hardware similar to the network interface hardware 116 of the server 108 to permit the seller device 102, the buyer device 104, and the dealer device 106 to communicate with the server 108 via the network 110. Similarly, the seller device 102, the buyer device 104, and the dealer device 106 include a controller similar to the controller 112 of the server 108 to permit the seller device 102, the buyer device 104, and the dealer device 106 to accept, decline, proceed, or the like in response to receiving a potential vehicle sale offer or suggestion provided by the server 108.

Figure 2:
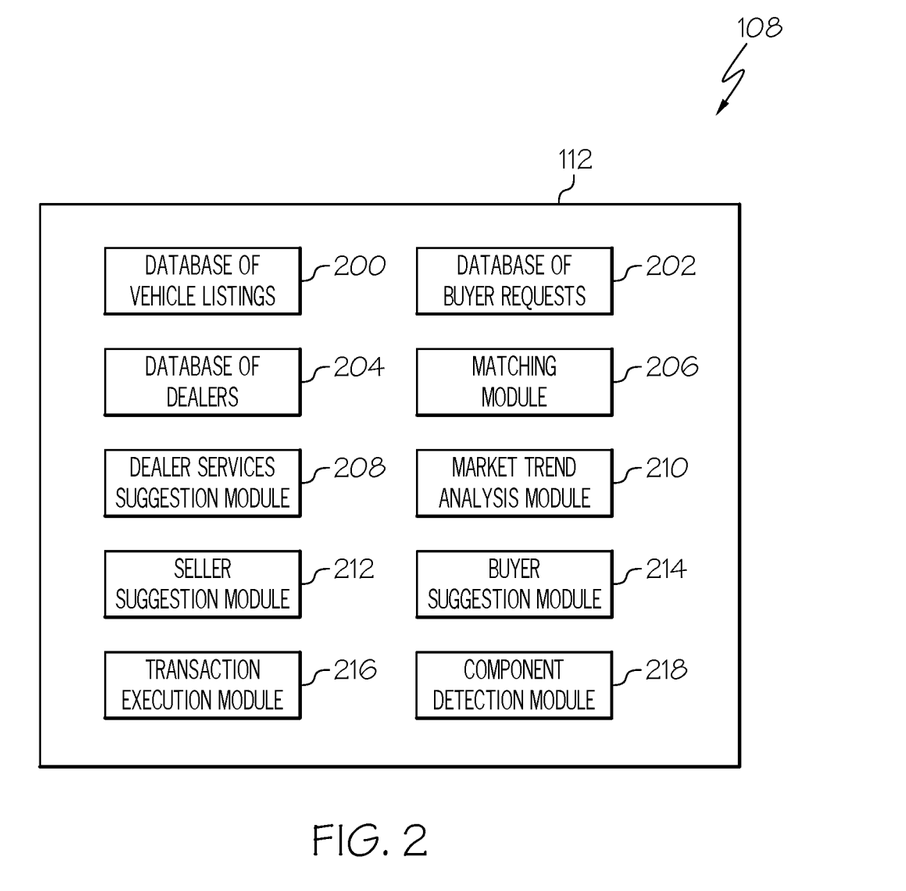
FIG. 2 schematically depicts a diagram of an exemplary controller of a server of the vehicle sale system of FIG. 1, according to one or more embodiments shown and described herein.

Referring now to FIG. 2, an exemplary controller 112 of the server 108 is shown. In embodiments, the controller 112 includes a database of vehicle listings 200, a database of buyer requests 202, a database of dealers 204, a matching module 206, a dealer services suggestion module 208, a market trend analysis module 210, a seller suggestion module 212, a buyer suggestion module 214, a transaction execution module 216, and a component detection module 218. Each of the database of vehicle listings 200, database of buyer requests 202, database of dealers 204, matching module 206, dealer services suggestion module 208, market trend analysis module 210, seller suggestion module 212, buyer suggestion module 214, transaction execution module 216, and component detection module 218 may be a program module in the form of operating systems, application program modules, and other program modules stored in the one or more memory modules 120. Such a program module may include, but is not limited to, routines, subroutines, programs, objects, components, data structures and the like for performing specific tasks or executing specific data types as will be described below.

The database of vehicle listings 200 of the server 108 operates as a storage device for the vehicle listings received from the seller device 102, as well as any other vehicle listings received from other seller devices. The database of vehicle listings 200 may occasionally receive signals from the seller device 102 to update a particular vehicle listing such as, for example, when a seller wishes to change the listing or selling price of the vehicle.

Similarly, the database of buyer requests 202 of the server 108 operates as a storage device for the buyer requests received from the buyer device 104, as well as any other buyer requests received from other buyer devices. The database of buyer requests 202 may occasionally receive signals from the buyer device 104 to update a particular buyer request such as, for example, when a buyer wishes to change the desired make and model of the vehicle to be purchased or a desired purchase price.

Additionally, the database of dealers 204 of the server 108 operates as a storage device for dealer profiles created by dealers via the dealer device 106. The dealer profiles may include various services offered by the dealer such as, for example, vehicle inspection, vehicle reconditioning, vehicle certification, test drive scheduling, purchase agreement preparation, registration and title transfer document preparation, vehicle delivery, new vehicle incentives, and trial memberships. The database of dealers 204 may occasionally receive signals from the dealer device 106 to update a particular dealer profile such as, for example, when a dealer offers new services or the dealer no longer offers previously offered services.

The matching module 206 of the server 108 is configured to match a specific vehicle listing stored within the database of vehicle listings 200 with a specific buyer request stored within the database of buyer requests 202. In general, the matching module 206 extracts specific parameters, such as make/model of vehicle and price, from each of the vehicle listings and the buyer requests and identifies one or more buyer requests that has parameters matching extracted parameters of one or more vehicle listings. Once a match is identified, the seller device 102 that created the vehicle listing and the buyer device 104 that created the buyer request are notified of the match. In embodiments, one vehicle listing may be matched to a plurality of buyer requests if the parameters of the buyer requests each satisfy the parameters of the vehicle listing. In this case, the seller device 102 will be notified of each of the matches and the matched buyer requests may be provided in a list format to the seller device 102. Similarly, in embodiments, one buyer request may be matched to a plurality of vehicle listings if the parameters of the vehicle listings each satisfy the parameters of the buyer request. In this case, the buyer device 104 will be notified of each of the matches and the matched vehicle listings may be provided in a list format to the buyer device 104. It should be appreciated that a "match", as referred to herein, between a particular vehicle listing and a buyer request must be within a predetermined threshold. As such, each parameter of a vehicle listing may be provided a value and a closeness to that value may be calculated for each corresponding parameter of a buyer request. Similarly, each parameter of a buyer request may be provided a value and a closeness to that value may be calculated for each corresponding parameter of a buyer request. The total sum of the closeness for each parameter may be utilized to determine an overall closeness or "match" score, which is used to rank a plurality of matches.

After a match is determined, the server 108 may send a signal including a dealer service suggestion to one or both of the seller device 102 and the buyer device 104 identifying one or more services that may be offered by a dealer to facilitate the sale of the vehicle of the matched vehicle listing. The services are determined based upon the services offered by the dealer device 106, which is stored in the dealer services suggestion module 208. The dealer service suggestion may be displayed on the seller device 102 and or the buyer device 104, which may then select one or more of the particular services. Prior to sending the signal to the seller device 102 and the buyer device 104, the server 108 may send a signal including a request to the dealer device 106 to confirm that the dealer still desires to offer the services.

Referring still to FIG. 2, the market trend analysis module 210 of the server 108 tracks previous vehicle sales and stores data points such as, for example, vehicle make/model, offer price, sale price, date, geographic location of vehicle listing and buyer offer, specific vehicle modifications from stock condition, duration of time for vehicle to sell, and the like for each of these vehicle sales. This information may be analyzed using a machine learning algorithm to identify an estimated price at which any vehicle with specific upgrades/downgrades from stock is likely to sell. Additionally, the market trend analysis module 210 may also analyze this information from previous vehicle sales to determine how long a vehicle is likely to take to sell based on the current condition of the vehicle, e.g., upgrades/downgrades, and listing price. Accordingly, as discussed in more detail herein, the market trend analysis module 210 is configured to determine how a vehicle listing may be modified, such as by performing one or more upgrades and/or downgrades to the vehicle, adjusting the listing price, and the like, to increase the probability that the vehicle listing will be matched to a buyer request, reduce the time to match the vehicle listing with a buyer request, and increase the net profit for the seller.

After the market trend analysis module 210 identifies one or more possibilities for increasing the probability that the vehicle listing will be matched to a buyer request, reducing the time to match the vehicle listing with a buyer request, and/or increasing the net profit for the seller, the market trend analysis module 210 will create one or more seller suggestions and, in some embodiments, one or more buyer suggestions. The seller suggestion module 212 will send a signal to the seller device 102 and display the seller suggestions on the seller device 102. In embodiments, the seller suggestion module 212 may send a signal recommending that the seller perform one or more upgrades to the vehicle if it is determined that there is a higher probability to be matched to a buyer request requesting a vehicle similar to vehicle in the vehicle listing, but including the one or more upgrades. The one or more upgrades may include upgrading the suspension of the vehicle, adding a turbocharger or supercharger, increasing the wheel size, adding a spoiler, and the like. By performing these upgrades, the seller is also able to potential increase the listing price to reflect the upgraded parts. When these seller suggestions are accepted by the seller device 102, the server 108 may send a signal to the dealer device 106 such that the dealer may be able to assist the seller in carrying out the upgrades.

Alternatively, the seller suggestion module 212 may send a signal recommending that the seller perform one or more downgrades to the vehicle if it is determined that there is a higher probability to be matched to a buyer request requesting a vehicle similar to vehicle in the vehicle listing, but including the one or more downgrades. The one or more downgrades may include returning any previously upgraded or modified parts of the vehicle to an original stock condition. By downgrading certain parts of the vehicle, the seller is able to reduce the listing price to improve the probability of being matched with a buyer request including a lower purchase price. When these seller suggestions are accepted by the seller device 102, the server 108 may send a signal to the dealer device 106 such that the dealer may be able to assist the seller in carrying out the downgrades. In addition, the seller may be able to recoup at least some of the difference in price between the original listing price and the new listing price by selling the original parts to the dealer.

Similar to the market trend analysis module 210 determining seller suggestions and sending these seller suggestions to the seller device 102, the market trend analysis module 210 may also determine buyer suggestions and the buyer suggestion module 214 may send these buyer suggestions to the buyer device 104. The buyer suggestion module 214 may send one or more buyer suggestions to the buyer device 104 to be displayed. The buyer suggestions may include, for example, modifying a purchase price in the buyer request, modifying desired features in a particular make/model of a vehicle to be purchased, and the like. More particularly, the buyer suggestion module 214 may present the buyer device 104 with one or more buyer suggestions recommending various upgrades or downgrades to the desired vehicle based on the current vehicle listings stored in the database of vehicle listings 200. If the buyer suggestions are accepted by the buyer device 104, the server 108 may send a signal to the dealer device 106 with instructions for the dealer to coordinate with a particular buyer of a buyer listing that can be modified to satisfy the buyer request. Accordingly, a buyer request and a vehicle listing that would otherwise not be matched, may now be matched based on the modified criteria of the buyer request and the to-be-modified vehicle of the vehicle listing.

In any event, once a vehicle listing is matched with a buyer request and both parties, i.e., the seller of the seller device 102 and the buyer of the buyer device 104, have accepted the sale of the vehicle, and in some embodiments, the dealer device 106 has accepted to perform one or more modifications, e.g., upgrades/downgrades, to the vehicle, the transaction execution module 216 may execute the vehicle sale. Specifically, the transaction execution module 216 may facilitate execution of the vehicle sale by requiring each party to sign an agreement, which may be prepared by the dealer device 106 and sent to the server 108. Additionally, the transaction execution module 216 will remove the vehicle listing and the buyer request from the database of vehicle listings 200 and the database of buyer requests 202, respectively, and record the vehicle sale in the market trend analysis module 210.

As noted above, the controller 112 includes a component detection module 218. As discussed herein, the seller device 102 may receive a signal recommending that the vehicle associated with the seller device 102 be upgraded or downgraded. As such, the controller 112 may be configured to identify an initial current state of the vehicle as well as a modified state of the vehicle. The initial state of the vehicle may include a listing of particular vehicle components prior to the modification, i.e., upgrade or downgrade, initial performance metrics of the vehicle components prior to the modification, and the like. Similarly, the modified state of the vehicle may include a listing of particular vehicle components after the modification, modified performance metrics of the vehicle components after the modification, and the like. The component detection module 218 may communicate, such as by any suitable wired or wireless connection, with one or more sensors of the vehicle, either specific to a particular vehicle component or a bus of the vehicle, to identify the state of the components of the vehicle.

The component detection module 218 is configured to compare the initial state of the vehicle and the modified state of the vehicle to determine whether the vehicle, or one or more specific components of the vehicle have been upgraded or downgraded. Based on this determination, it may be concluded that an existing vehicle component of the vehicle has been replaced with a replacement vehicle component in accordance with the seller suggestion received at the seller device 102.

Figure 3:
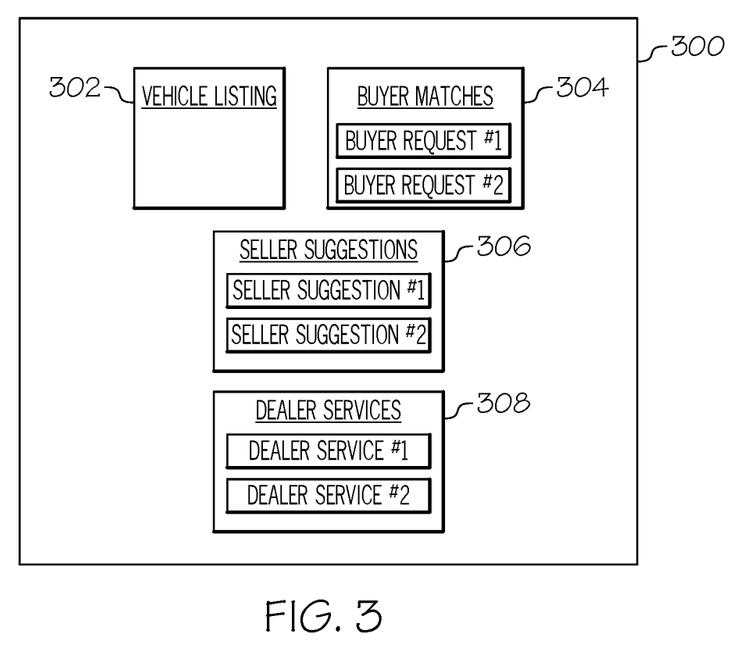
FIG. 3 schematically depicts a graphical user interface of a seller device of the vehicle sale system of FIG. 1, according to one or more embodiments shown and described herein.

Referring now to FIG. 3, a seller graphical user interface 300 is illustrated. The seller graphical user interface 300 is illustrated for exemplary purposes only for depicting general information generated by the server 108 and displayed on the seller device 102. However, it should be understood that the information generated by the server 108 may be displayed on the seller device 102 in any suitable manner other than that specifically described herein.

In embodiments, the seller graphical user interface 300 includes a vehicle listing element 302 for displaying the particular vehicle listing created by the seller device 102. In embodiments, the vehicle listing element 302 may display a plurality of vehicle listings created by the seller device 102. The seller graphical user interface 300 also includes a buyer matching element 304 for displaying one or more buyer matches determined by the matching module 206 of the server 108, as discussed herein. In response to the matching module 206 of the server 108 identifying the one or more buyer matches, the one or more buyer matches are caused to be displayed within the buyer matching element 304 of the seller graphical user interface 300. The seller device 102 may be operated to select one of the buyer requests to display additional information, contact the buyer device directly, or accept a buyer match and proceed to execute the vehicle sale. Prior to selecting or accepting a particular buyer request in the buyer matching element 304, the server 108 may cause a seller suggestion element 306 to be displayed on the seller graphical user interface 300. Particularly, the server 108 may cause one or more seller suggestions, as discussed herein, to be displayed on the seller graphical user interface 300. The seller device 102 may be operated to select one of the seller suggestions to display additional information such as, for example, the cost of the suggestion, which may be a recommended upgrade or downgrade to the seller vehicle. By selecting one of the seller suggestions within the seller suggestion element 306, the seller may accept the particular seller suggestion.

In embodiments, the seller graphical user interface 300 also includes a dealer services element 308. As discussed herein, the dealer associated with the dealer device 106 may be able to assist in completing the vehicle sale between the seller device 102 and the buyer device 104 by offering one or more dealer services. These dealer services may also incentivize either the seller of the seller device 102 or the buyer of the buyer device 104 to proceed with the sale. As such, the dealer device 106 may be configured to cause one or more dealer services to be displayed in the dealer services element 308 of the seller graphical user interface 300. The seller device 102 may be operated to select one of the dealer services to display additional information such as, for example, the cost of the particular dealer service.

Figure 4:
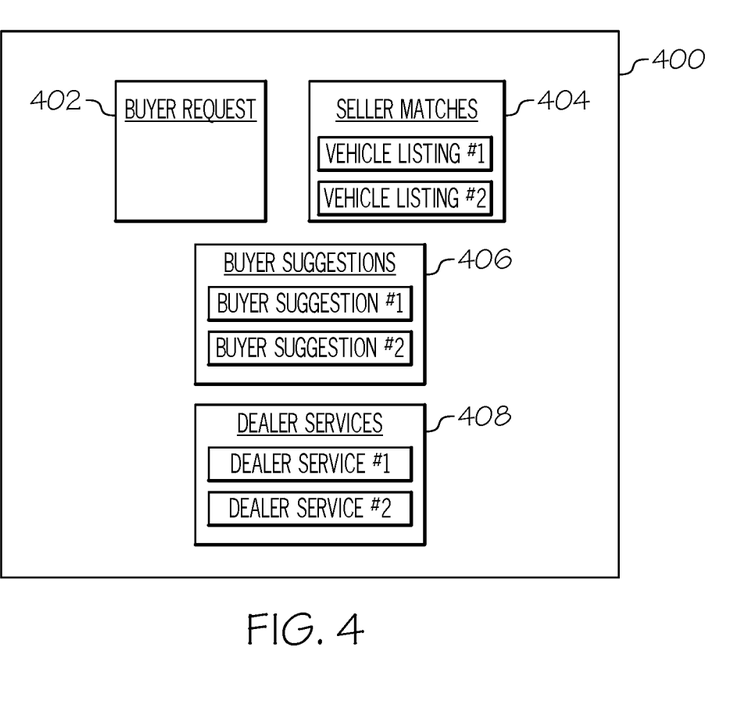
FIG. 4 schematically depicts a graphical user interface of a buyer device of the vehicle sale system of FIG. 1, according to one or more embodiments shown and described herein.

Referring now to FIG. 4, a buyer graphical user interface 400 is illustrated. The buyer graphical user interface 400 is illustrated for exemplary purposes only for depicting general information generated by the server 108 and displayed on the buyer device 104. However, it should be understood that the information generated by the server 108 may be displayed on the buyer device 104 in any suitable manner other than that specifically described herein.

In embodiments, the buyer graphical user interface 400 includes a buyer request element 402 for displaying the particular buyer request created by the buyer device 104. In embodiments, the buyer request element 402 may display a plurality of buyer requests created by the buyer device 104. The buyer graphical user interface 400 also includes a seller matching element 404 for displaying one or more seller matches determined by the matching module 206 of the server 108, as discussed herein. In response to the matching module 206 of the server 108 identifying the one or more seller matches, the one or more seller matches are caused to be displayed within the seller matching element 404 of the buyer graphical user interface 400. The buyer device 104 may be operated to select one of the seller requests to display additional information, contact the seller device directly, or accept a seller match and proceed to execute the vehicle sale. Prior to selecting or accepting a particular seller request in the seller matching element 404, the server 108 may cause a buyer suggestion element 406 to be displayed on the buyer graphical user interface 400. Particularly, the server 108 may cause one or more buyer suggestions, as discussed herein, to be displayed on the buyer graphical user interface 400. The buyer device 104 may be operated to select one of the buyer suggestions to display additional information such as, for example, a recommended modification to the buyer request. By selecting one of the buyer suggestions within the buyer suggestion element 406, the buyer may accept the particular buyer suggestion.

In embodiments, the buyer graphical user interface 400 also includes a dealer services element 408. It should be appreciated that the particular dealer services caused to be displayed on the buyer graphical user interface 400 by the server 108 may be the same dealer services caused to be displayed on the seller graphical user interface 300 or different than those displayed on the seller graphical user interface 300. The buyer device 104 may be operated to select one of the dealer services to display additional information such as, for example, the cost of the particular dealer service.

Figure 5:
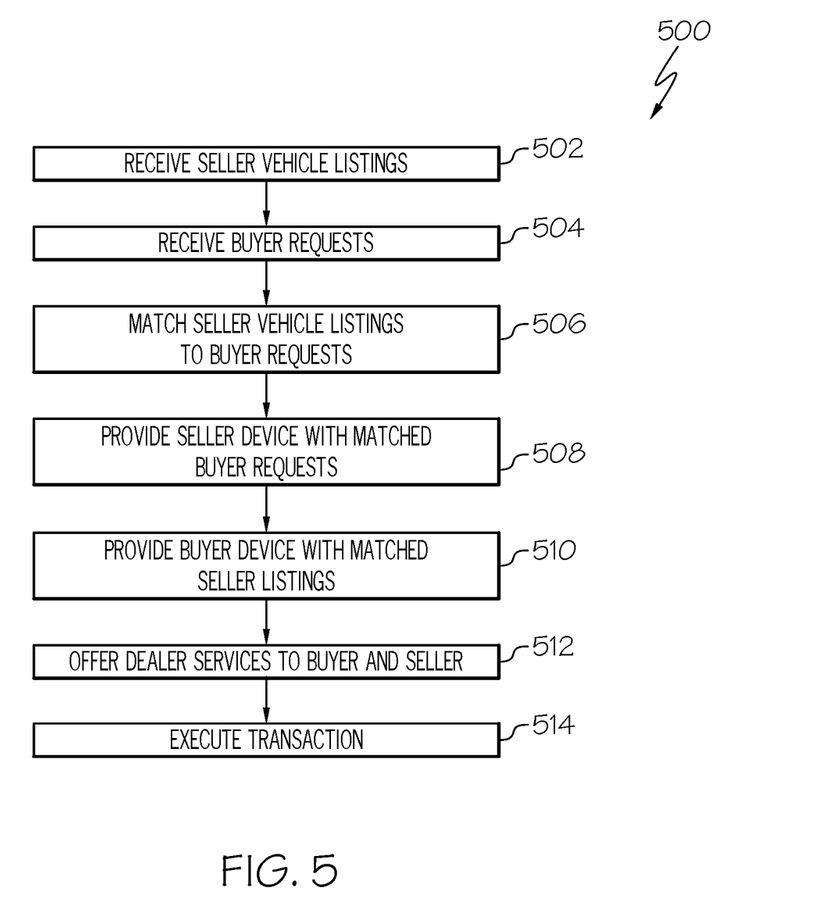
FIG. 5 schematically depicts a flowchart of an illustrative method for offering dealer services to a vehicle seller, according to one or more embodiments shown and described herein.

Referring now to FIG. 5, a method 500 is depicted for providing dealer services to a seller device 102 and a buyer device 104. The method 500 is discussed with reference to the vehicle sale system 100 and individual components thereof illustrated in FIGS. 1-3.

At step 502, the server 108 receives a vehicle listing created by a seller device 102, as well as other vehicle listings created by other seller devices 102. Similarly, at step 504, the server 108 receives a buyer request created by a buyer device 104, as well as other buyer requests created by other buyer devices 104.

At step 506, the matching module 206 of the server 108 matches the vehicle listings and the buyer requests, if matches are possible. For example, the matching module 206 of the server 108 may match the vehicle listing of the seller device 102 to the buyer request of the buyer device 104. As discussed in more detail herein, the matching module 206 operates by assigning each parameter of a vehicle listing a value and a closeness to that value may be calculated for each corresponding parameter of a buyer request. Similarly, each parameter of a buyer request may be provided a value and a closeness to that value may be calculated for each corresponding parameter of a buyer request.

At step 508, the buyer request matches identified by the matching module 206 are sent to the seller device 102 and displayed on the seller device 102, specifically, the buyer matching element 304 of the seller graphical user interface 300. Similarly, at step 510, the vehicle listing matches identified by the matching module 206 are sent to the buyer device 104 and displayed on the buyer device 104, specifically, the seller matching element 404 of the buyer graphical user interface 400. At this point, the seller and the buyer are permitted to select which matched vehicle listing or buyer request is acceptable and proceed to execute the vehicle sale. However, as discussed herein, at step 512, prior to executing the vehicle sale, the server 108 provides the seller device 102 and the buyer device 104 with one or more dealer services offered by a dealer associated with the dealer device 106. As discussed herein, the dealer services are caused to be displayed by the server 108 in the dealer services element 308 of the seller graphical user interface 300 and the dealer services element 408 of the buyer graphical user interface 400. In response to the seller device 102 or the buyer device 104 selecting one or more of the dealer services offered, the dealer associated with the dealer device 106 may be sent a signal from the server 108 to carry out these services. Either prior to or after the dealer services being rendered, at step 514, the transaction execution module 216 of the server 108 facilitates execution of the vehicle sale. Additionally, as noted above, the transaction execution module 216 will remove the vehicle listing and the buyer request from the database of vehicle listings 200 and the database of buyer requests 202, respectively, and record the vehicle sale in the market trend analysis module 210.

Figure 6:
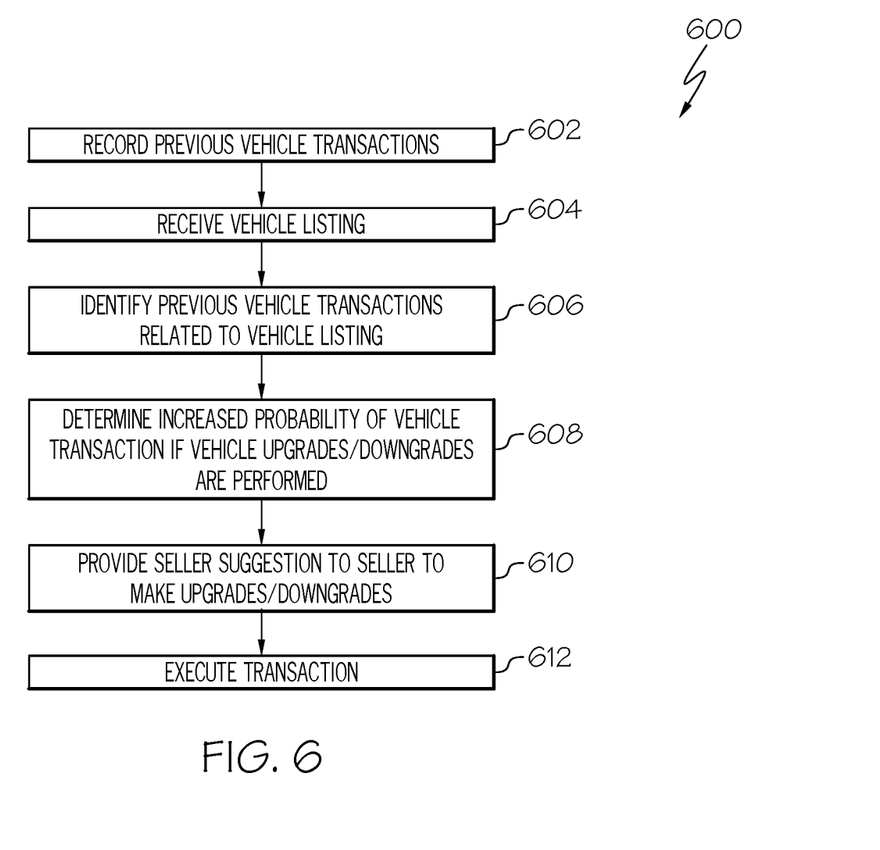
FIG. 6 schematically depicts a flowchart of an illustrative method for providing seller suggestions to a vehicle seller, according to one or more embodiments shown and described herein.

Referring now to FIG. 6, a method 600 is depicted for providing suggestions to a seller to modify a vehicle to be sold. The method 600 is discussed with reference to the vehicle sale system 100 and individual components thereof illustrated in FIGS. 1-3.

At step 602, the server 108 records completed vehicle transactions between seller devices and buyer devices. As discussed herein, the previously completed vehicle transactions are stored in the market trend analysis module 210 of the server 108.

At step 604, the server 108 receives a vehicle listing from the seller device 102 identifying a vehicle to be sold by the seller associated with the seller device 102. At step 606, in response to the server 108 receiving the vehicle listing from the seller device 102 and determining that no buyer request stored in the database of buyer requests 202 is a match for the particular vehicle listing, the market trend analysis module 210 identifies previous vehicle transactions for vehicles related or similar to the vehicle listing. For example, the market trend analysis module 210 may identify previous vehicle transactions for vehicles related or similar, e.g., has a predetermined number of identical features, to the vehicle identified in the vehicle listing. At step 608, the market trend analysis module 210 determines whether performing one or more vehicle upgrades and/or downgrades will increase a probability of a vehicle transaction, i.e., match with a buyer request. The market trend analysis module 210 makes this determination based on the previously recorded vehicle transactions similar to the vehicle of the vehicle listing. More particularly, the market trend analysis module 210 makes this determination by determining a first estimated time for the vehicle to be sold based on the market trends and a current state of the vehicle without satisfying or making any modification, and determining a second estimated time for the vehicle to be sold based on the market trends and a modified state of the seller vehicle after the one or more modifications to the vehicle are made.

At step 610, when the second estimated time is less than the first estimated time, the seller suggestion module 212 presents the seller device 102 with one or more seller suggestions corresponding to the one or more vehicle upgrades and/or downgrades determined at step 608. As discussed herein, the seller suggestions are caused to be displayed by the server 108 in the seller suggestion element 306 in the seller graphical user interface 300. Accordingly, the seller device 102 is presented with the one or more seller suggestions and, upon selecting one or more of the seller suggestions, the server 108 may send a signal to the dealer device 106 to facilitate making the upgrades and/or downgrades to the vehicle. In embodiments, the seller device 102 may be presented with a plurality of seller suggestions in the seller suggestion element 306 with each seller suggestion providing a suggestion to modify the vehicle to replace existing vehicle components of the vehicle with replacement vehicle components. In embodiments, the seller suggestion module 212 may present the seller device 102 with a plurality of seller suggestions to make one or more modifications to the vehicle. Each of the plurality of seller suggestions may indicate a different one or more modification to the vehicle. At step 612, the transaction execution module 216 of the server 108 facilitates execution of the vehicle sale, as discussed herein, by removing the vehicle listing and the buyer request from the database of vehicle listings 200 and the database of buyer requests 202, respectively, and recording the vehicle sale in the market trend analysis module 210.

Figure 7:
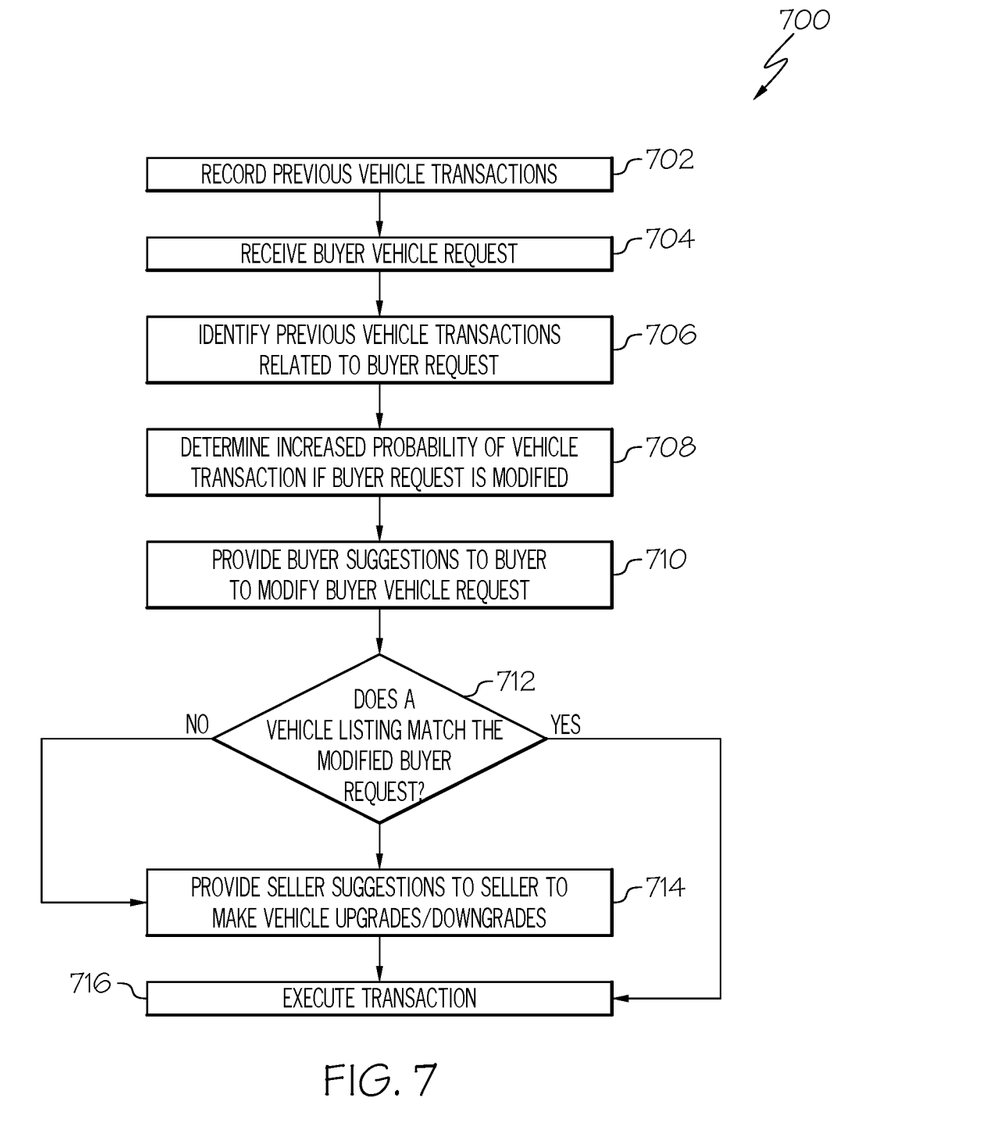
FIG. 7 schematically depicts a flowchart of an illustrative method for providing buyer suggestions to a vehicle buyer, according to one or more embodiments shown and described herein.

Referring now to FIG. 7, a method 700 is depicted for providing buyer suggestions to a buyer. The method 500 is discussed with reference to the vehicle sale system 100 and individual components thereof illustrated in FIGS. 1-3.

At step 702, the server 108 records completed vehicle transactions between seller devices and buyer devices. As discussed herein, the previously completed vehicle transactions are stored in the market trend analysis module 210 of the server 108.

At step 704, the server 108 receives a buyer request from the buyer device 104 identifying a vehicle desired to be purchased by the buyer associated with the buyer device 104. At step 706, in response to the server 108 receiving the buyer request from the buyer device 104 and determining that no vehicle listing stored in the database of vehicle listings 200 is a match for the particular buyer request, the market trend analysis module 210 identifies previous vehicle transactions for vehicles related or similar to the vehicle identified in the buyer request. At step 708, the market trend analysis module 210 determines whether modifying the buyer request, specifically the parameters, e.g., features, of the desired vehicle in the buyer request will increase a probability of a vehicle transaction, i.e., match with a vehicle listing. The market trend analysis module 210 makes this determination based on the previously recorded vehicle transactions similar to the vehicle of the buyer request.

At step 710, if it is determined that modifying the parameters of the vehicle of the buyer request will increase the probability of a vehicle transaction, the buyer suggestion module 214 of the server 108 presents the buyer device 104 with one or more buyer suggestions to modify the buyer request. The buyer suggestion module 214 may cause the buyer suggestions to be displayed in the buyer suggestion element 406 of the buyer graphical user interface 400. Specifically, the buyer suggestion module 214 may provide one or more buyer suggestions that the vehicle originally provided in the buyer request should be modified such that the vehicle is upgraded and/or downgraded in some manner. At step 712, in response to one or more buyer suggestions being accepted by the buyer device 104, it is determined whether a vehicle matching the upgraded/downgraded vehicle in the modified buyer request is provided in the database of vehicle listings 200. If a vehicle listing matching the modified buyer request is identified at step 712, the method 700 proceeds to step 716 where the vehicle sale transaction is executed, as discussed herein. Alternatively, if a vehicle listing matching the modified buyer request is not identified at step 712, the method 700 proceeds to step 714 where one or more seller suggestions corresponding to the one or more buyer suggestions are provided to the seller device 102 to make the vehicle upgrades and/or downgrades accepted by the buyer. If the one or more seller suggestions are accepted by the seller device 102, the method 700 proceeds to step 716. As discussed herein, the server 108 may send a signal to the dealer device 106 to assist in performing the various upgrades and/or downgrades to the vehicle associated with the seller device 102 so as to satisfy the modified buyer request.

From the above, it is to be appreciated that defined herein are systems and methods for facilitating a vehicle transaction while making suggestions to a vehicle seller to make modifications to the vehicle prior to increase the probability that the vehicle will sell in less time. Specifically, the systems and methods described herein receive a vehicle listing from a seller device identifying a seller vehicle to be sold, identify market trends based on previous vehicle transactions related to the seller vehicle, and send one or more seller suggestions to the seller device identifying one or more modifications to the seller vehicle which, if satisfied, would increase a probability that the seller vehicle will be matched to a buyer request received from a buyer device.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   receiving, at a server, a vehicle listing from a seller device identifying a seller vehicle to be sold;
   identifying, by the server, market trends by a market trend analysis module based on previous vehicle transactions related to the seller vehicle;
   causing, by the server, one or more seller suggestions to be displayed on the seller device identifying one or more modifications to the seller vehicle which, if satisfied, would increase a probability that the seller vehicle will be matched to a buyer request received from a buyer device, the one or more seller suggestions including a suggestion to modify the seller vehicle;
   comparing, by the server, an initial state of the seller vehicle and a modified state of the seller vehicle;
   determining, by the server, whether the existing vehicle component of the seller vehicle has been modified or replaced based on the comparing of the initial state and the modified state; and
   in response to matching the seller vehicle with a buyer request and executing a vehicle sale of the seller vehicle by the server, recording, by the server, the vehicle sale in the market trend analysis module and updating, by the server, the market trend analysis module for purposes of improving the probability of future vehicle matches.

2. The method of claim 1, further comprising:
   determining, by the server, a first estimated time for the seller vehicle to be sold based on the market trends and a current state of the seller vehicle without satisfying the one or more modifications to the seller vehicle;
   determining, by the server, a second estimated time for the seller vehicle to be sold based on the market trends and a modified state of the seller vehicle after the one or more modifications to the seller vehicle are satisfied; and
   in response to the second estimated time being less than the first estimated time, sending, by the server, the one or more seller suggestions to the seller device to make the one or more modifications to the seller vehicle.

3. The method of claim 2, further comprising, in response to the second estimated time being less than the first estimated time, sending, by the server, a plurality of seller suggestions to the seller device to make one or more modifications to the seller vehicle, each of the plurality of seller vehicle suggestions indicating a different one or more modification to the seller vehicle.

4. The method of claim 1, further comprising sending, by the server, the one or more seller suggestions to the seller device in response to receiving the vehicle listing and matching the vehicle listing to the buyer request.

5. The method of claim 1, further comprising:
receiving, at the server, the buyer vehicle request from the buyer device identifying a buyer vehicle to be purchased; and
sending, by the server, one or more buyer suggestions to the buyer device in response to receiving the buyer request and matching the buyer request to the vehicle listing.

6. The method of claim 5, further comprising sending, by the server, the one or more seller suggestions to the seller device in response to the one or more buyer suggestions being accepted by the buyer device.

7. The method of claim 1, wherein the one or more modifications comprises instructions to perform at least one of an upgrade to the seller vehicle and a downgrade to the seller vehicle.

8. A system comprising:
a server configured to:
receive a vehicle listing from a seller device identifying a seller vehicle to be sold;
identify market trends by a market trend analysis module based on previous vehicle transactions related to the seller vehicle;
cause one or more seller suggestions to be displayed on the seller device identifying one or more modifications to the seller vehicle which, if satisfied, would increase a probability that the seller vehicle will be matched to a buyer request received from a buyer device, the one or more seller suggestions including a suggestion to modify the seller vehicle;
compare an initial state of the vehicle and a modified state of the vehicle;
determine whether the existing vehicle component of the seller vehicle has been modified or replaced based on a comparison of the initial state and the modified state; and
in response to matching the seller vehicle with a buyer request and executing a vehicle sale of the seller vehicle, recording the vehicle sale in the market trend analysis module and updating the market trend analysis module for purposes of improving the probability of future vehicle matches.

9. The system of claim 8, wherein the server is further configured to:
determine a first estimated time for the seller vehicle to be sold based on the market trends and a current state of the seller vehicle without satisfying the one or more modifications to the seller vehicle;
determine a second estimated time for the seller vehicle to be sold based on the market trends and a modified state of the seller vehicle after the one or more modifications to the seller vehicle are satisfied; and
in response to the second estimated time being less than the first estimated time, send the one or more seller suggestions to the seller device to make the one or more modifications to the seller vehicle.

10. The system of claim 9, wherein the server is further configured to:
in response to the second estimated time being less than the first estimated time, send a plurality of seller suggestions to the seller device to make one or more modifications to the seller vehicle, each of the plurality of seller vehicle suggestions indicating a different one or more modification to the seller vehicle.

11. The system of claim 8, wherein the server is further configured to:
send the one or more seller suggestions to the seller device in response to receiving the vehicle listing and matching the vehicle listing to the buyer request.

12. The system of claim 8, wherein the server is further configured to:
receive the buyer vehicle request from the buyer device identifying a buyer vehicle to be purchased; and
send one or more buyer suggestions to the buyer device in response to receiving the buyer request and matching the buyer request to the vehicle listing.

13. The system of claim 12, wherein the server is further configured to:
send the one or more seller suggestions to the seller device in response to the one or more buyer suggestions being accepted by the buyer device.

14. The system of claim 8, wherein the one or more modifications comprises instructions to perform at least one of an upgrade to the seller vehicle and a downgrade to the seller vehicle.

15. The system of claim 8, wherein the seller vehicle includes a plurality of parameters, each of the plurality of parameters provided a value, a closeness to that value being calculated for each corresponding parameter in the buyer request.

16. The system of claim 8, wherein the server includes one or more memory modules including a machine learning algorithm configured to determine how long the seller vehicle is likely to take until a match with the buyer request is satisfied based on a current condition of the seller vehicle.

17. The system of claim 8, wherein the seller device is provided with one or more seller suggestions in response to one or more buyer suggestions being accepted by the buyer device.

* * * * *

UNITED STATES PATENT AND TRADEMARK OFFICE
CERTIFICATE OF CORRECTION

PATENT NO. : 12,367,520 B2
APPLICATION NO. : 17/713774
DATED : July 22, 2025
INVENTOR(S) : Tyler J. Brown et al.

It is certified that error appears in the above-identified patent and that said Letters Patent is hereby corrected as shown below:

In the Specification

In Column 4, Line 15, delete "Alternative," and insert --Alternatively,--, therefor.

In Column 7, Line 23, delete "has" and insert --have--, therefor.

In Column 8, Line 40, delete "potential" and insert --potentially--, therefor.

In the Claims

In Column 14, Line 47, Claim 1, delete "comparing" and insert --comparison--, therefor.

In Column 15, Line 9, Claim 3, delete "modification" and insert --modifications--, therefor.

In Column 15, Line 27, Claim 7, delete "comprises" and insert --comprise--, therefor.

In Column 16, Line 20, Claim 10, delete "modification" and insert --modifications--, therefor.

In Column 16, Line 39, Claim 14, delete "comprises" and insert --comprise--, therefor.

In Column 16, Line 44, Claim 15, after "parameters", insert --is--.

Signed and Sealed this
Second Day of September, 2025

Coke Morgan Stewart
*Acting Director of the United States Patent and Trademark Office*